United States Patent [19]

Sulkowski et al.

[11] 3,864,360
[45] Feb. 4, 1975

[54] N-(2-[3-HYDROXY-3-PHENYL-2-PHTHALIMIDINYL]-ETHYL)-SULFONAMIDES

[75] Inventors: Theodore S. Sulkowski, Wayne; Albert A. Mascitti, Norristown, both of Pa.

[73] Assignee: American Home Products Corporation, New York, N.Y.

[22] Filed: Aug. 14, 1972

[21] Appl. No.: 280,634

Related U.S. Application Data

[62] Division of Ser. No. 10,984, Feb. 12, 1970, abandoned.

[52] U.S. Cl. ..... 260/325 PH, 260/294.8 C, 260/309, 260/309.6, 260/309.7, 424/274, 424/273
[51] Int. Cl. ............................... C07d 27/50
[58] Field of Search .................... 260/325, 325 PH

[56] References Cited
UNITED STATES PATENTS
3,634,452    1/1972    Fischer et al. ...................... 260/325

*Primary Examiner*—Joseph A. Narcavage

[57] ABSTRACT

Novel compounds have been prepared which have useful pharmacological activity as well as intermediates for their production. Some of the processes have utility for the production of other pharmacologically active compounds. The active compounds of this invention are those of the following formulas:

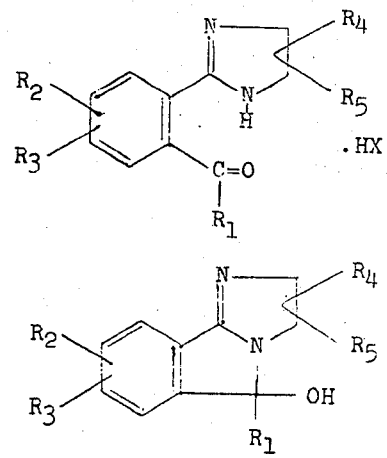

wherein $R_1$ is selected from the group consisting of phenyl, monohalophenyl, dihalophenyl, mono(lower)alkylphenyl, di(lower)alkylphenyl, trifluoromethylphenyl, mono(lower)alkoxyphenyl, di(lower)akoxyphenyl, thienyl, pyridyl, furyl, and tetrahydro-2-naphthyl; $R_2$ is selected from the group consisting of hydrogen, halogen, amino, (lower)alkylamino, (lower)alkyl and (lower) alkoxy; $R_3$ is hydrogen when $R_2$ and $R_3$ are dissimilar and when $R_2$ and $R_3$ are the same they are both selected from the group consisting of hydrogen, halogen, (lower)alkyl and (lower)alkoxy; $R_4$ and $R_5$ are lower alkyl and attached to the same carbon atom; X is the anion portion of a pharmacologically acceptable acid-addition salt.

7 Claims, No Drawings

N-(2-[3-HYDROXY-3-PHENYL-2-PHTHALIMIDINYL]-ETHYL)-SULFONAMIDES

This is a division of application Ser. No. 10,984 filed Feb. 12 1970 now abandoned.

This application discloses processes which may be applicable in the production of compounds disclosed in the U.S. Pat. application, Ser. No. 757,792, filed Sept. 5, 1968. The novel compounds of this invention exhibit antidepressant activity but, unlike the compounds disclosed in Ser. No. 757,792, do not possess anorexiant activities at therepeutic dosages.

This invention relates to pharmacologically active 5-aryl-2,3-dihydro-2,2(or 3,3)dimethyl-5H-imidazo[2,1-$a$]isoindol-5-ols and 2(4,4(or 5,5)dimethyl-2-imidazolin-2-yl)benzophenone acid addition salts and processes for their production. The intermediate compounds produced by the processes of the invention are also novel.

The new and novel compounds which are included within the scope of this invention are represented by the following formulae:

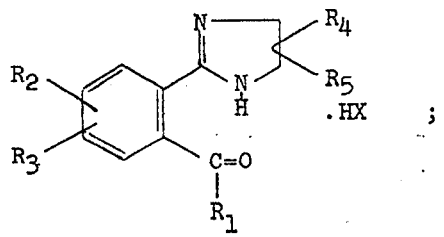

(I)

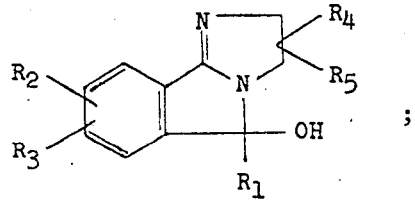

(II)

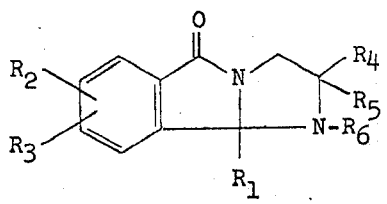

; and

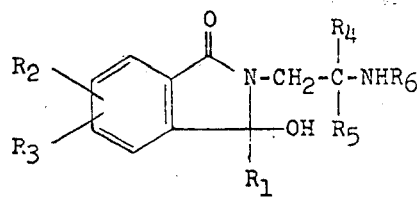

(III)                    (IV)

wherein R is selected from the group consisting of phenyl, monohalophenyl, dihalophenyl, mono(lower)alkylphenyl, di(lower)alkylphenyl, trifluoromethylphenyl, mono(lower)alkoxyphenyl, di(lower)alkoxyphenyl, thienyl, pyridyl, furyl and tetrahydro-2-naphthyl; $R_2$ is selected from the group consisting of hydrogen, halogen, amino, lower alkylamino, lower alkyl and lower alkoxy; $R_3$ is hydrogen, when $R_2$ and $R_3$ are dissimilar and when $R_2$ and $R_3$ are the same they are both selected from the group consisting of hydrogen, halogen, lower alkyl and lower alkoxy; $R_4$ and $R_5$ are selected from the group consisting of hydrogen and lower alkyl with the provisos that in formulae (I), (II) and (III) both $R_4$ and $R_5$ are lower alkyl and in formulae (I) and (II) both $R_4$ and $R_5$ are attached to the same carbon atom; $R_6$ is selected from the group consisting of hydrogen, lower alkylsulfonyl, phenylsulfonyl, monohalophenylsulfonyl, dihalophenylsulfonyl, mono(lower)alkylphenylsulfonyl, di(lower)alkylphenylsulfonyl and lower alkoxyphenylsulfonyl with the proviso that in formula (IV) $R_6$ is other than hydrogen; and X is an anion portion of a pharmacologically acceptable acid-addition salt.

As employed herein the term (lower)alkyl is meant to include straight and branched chain hydrocarbon moieties of from one to about four carbon atoms such as methyl, ethyl, propyl, i-propyl and butyl. The term (lower)alkoxy is used to include hydrocarbonoxy groups which contain from one to about six carbon atoms such as methoxy, ethoxy, propoxy, butoxy and hexoxy. The term "halogen" and "halo" as used herein are meant to include bromine, fluorine, chlorine and iodine.

Those skilled in the art will appreciate that the compounds of Formulas I and II are tautomers. It has been found that the base form (I) exists as the tricyclic imidazoisoindole form and the acid-addition salt (II) exists as the benzophenone form. The nature of the reaction by which the compounds are prepared does not allow the position of the gem dialkyl groups to be fixed with certainty. When the compound exists as the benzophenone type form, it is impossible to fix the position of the gem dialkyl groups because of the proton shift due to the —NH—C=N— group. Hence, the 2-(gem dialkyl-2-imidazolin-2-yl)benzophenone acid-addition salts are named as 4,4(5,5)dialkyl substituted compounds. This is in conformity with the nomenclature for imidazole type compounds set forth in *Heterocyclic Compounds*, R.C. Elderfield, Editor, Vol. 5, pp 198, 199 and 238, John Wiley and Sons, Inc., New York, 1957. When the imidazoisoindol-ol form of benzophenone tautomer is formed, the tautomerism of the HN—C=N— moiety does not permit any absolute prediction as to positioning of the gem dialkyl group in the imidazoisoindol-form. When the steric influence of the gem dialkyl group is considered, the probability is great that the product obtained is a 2,2-dialkyl compound. Gas chromatographic studies indicate a single compound is isolated and not a mixture of the 2,2-dialkyl and 3,3-dialkyl isomers. As the available evidence does not conclusively eliminate the possibility of the formation of the 3,3-dialkyl compound, the alternative nomenclature is employed herein, although it is believed that the structure is in actuality a 2,2-dialkyl-5H-imidazo[2,1-a]isoindol-5-ol.

The compounds of Formulas I and II may be prepared by contacting the appropriate phthalimidine with sulfuric acid and subsequently treating the product with base:

wherein $R_1$, $R_2$, $R_3$, $R_4$, $R_5$ and $R_6$ are the same as herein above defined. In addition, this method is operable for the production of compounds wherein $R_4$ and $R_5$ are hydrogen.

Concentrated sulfuric acid of 75–100% strength is comployed in converting compound V to compound VI. Generally, no criticality attaches to the use of a particular basic compound when the sulfate salt is treated to prepare the imidazoisoindol-ol base form. For example, sodium carbonate, sodium hydroxide, potassium hydroxide or sodium bicarbonate may be used. When the tautomeric acid-addition salt is prepared, the preferred method is to saturate a lower alkanolic solution of the base form of the compound with hydrogen chloride gas. Suitable lower alkanols include methanol, ethanol and propanol.

The intermediate sulfonated phthalimidines may be prepared as follows:

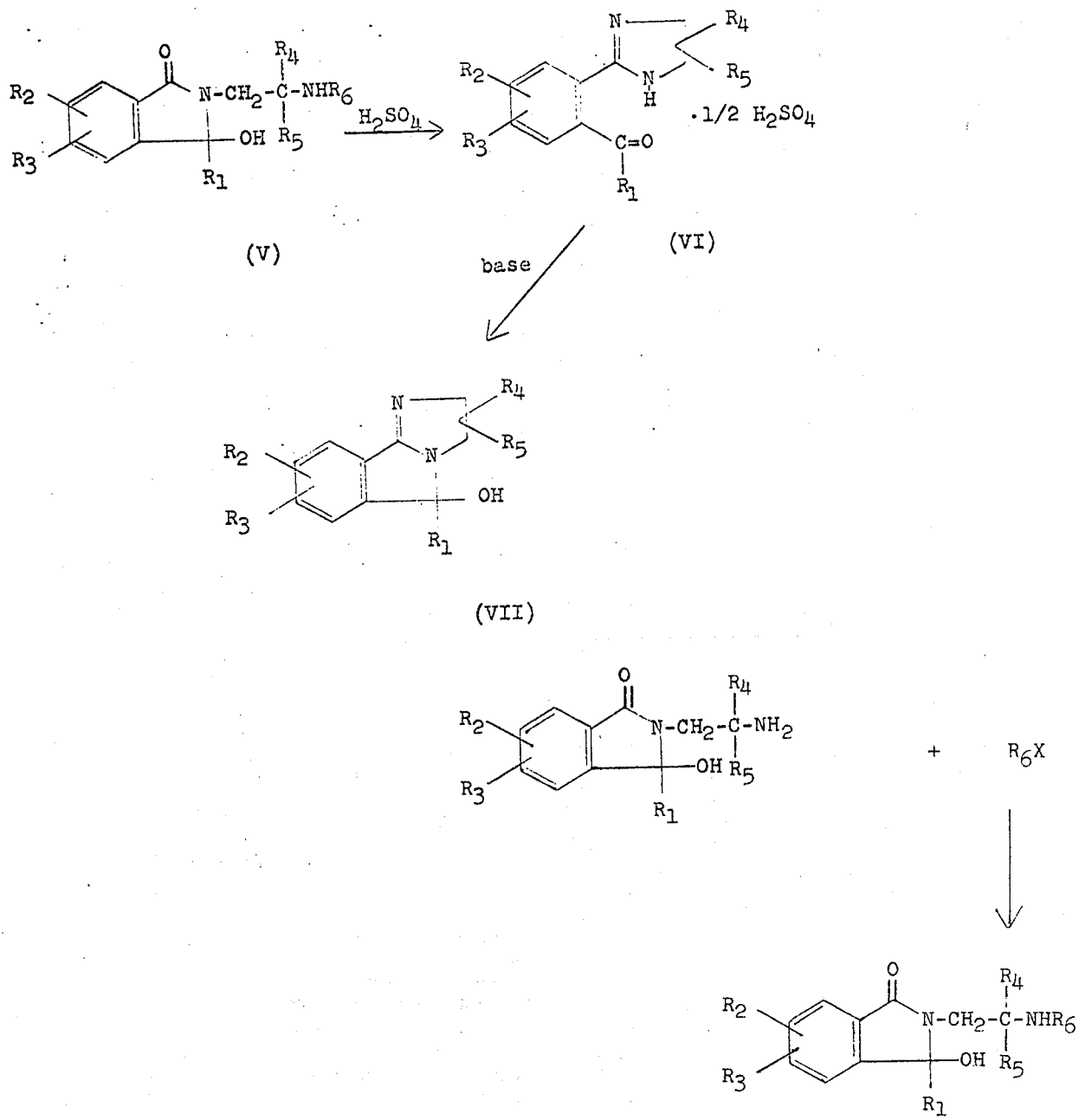

wherein $R_1$, $R_2$, $R_3$, $R_4$, $R_5$ and $R_6$ are the same as hereinabove defined and X is a halogen atom. In addition, $R_4$ and $R_5$ may hydrogen when intermediates are being prepared for making compounds wherein the imidazo moiety in unsubstituted. The sulfonation is usually conducted in pyridine although other suitable organic or aqueous solvents with a base such as sodium carbonate or triethylamine may be employed. The reactants are refluxed for about 12 to 24 hours, then the solvent is evaporated and the residue is partitioned between water and an immiscible organic solvent such as ethyl acetate, ether, chloroform or benzene. The organic portion is separated and then the solvent is evaporated. The residue is recrystallized from a lower alkanol such as methanol, ethanol or propanol to yield the sulfonated product.

The phthalimidines may be obtained by the hydrolysis of an imidazoisoindolone or by reaction of the Ψ-acid chloride of an o-aroyl benzoic acid with the appropriate 1,1-dialkylethylenediamine:

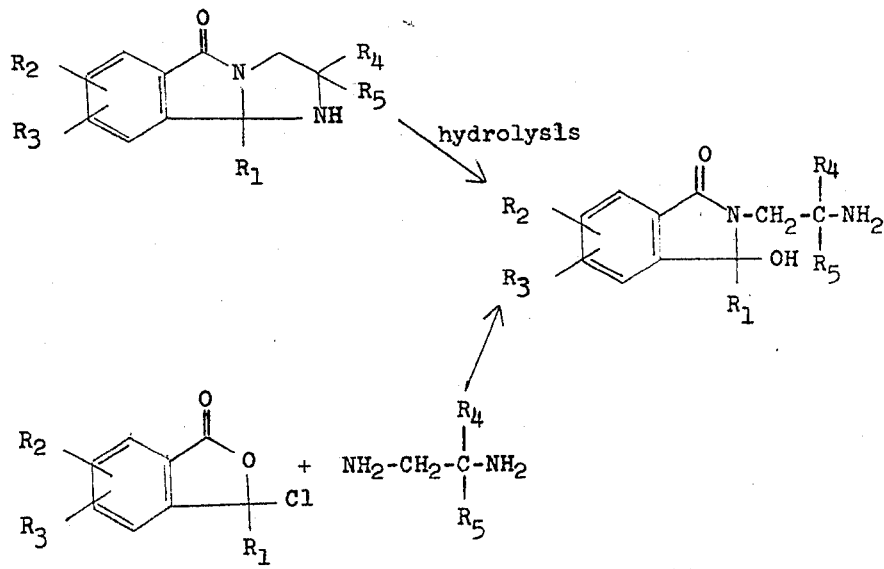

wherein $R_1$, $R_2$, $R_3$, $R_4$, $R_5$ and $R_6$ are the same as hereinabove defined.

The imidazoisoindolone compounds may be prepared by condensing a 1,1-dialkylethylenediamine with the appropriate o-(substituted carbonyl)benzoic acid:

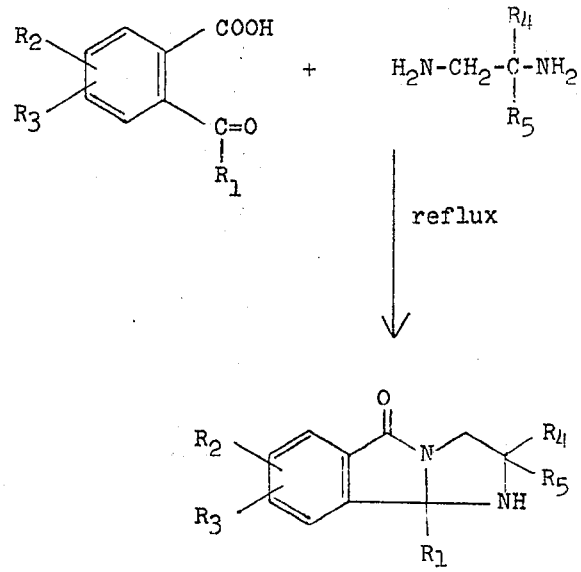

wherein $R_1$, $R_2$, $R_3$, $R_4$ and $R_5$ are the same as hereinabove defined.

The imidazoisoindolones may be prepared by refluxing the reactants in a water immiscible organic solvent such as toluene, benzene, xylene, chloroform, carbontetrachloride, pyridine, etc. The flask should be equipped with a water separator and the usual period of reflux is 12-24 hours. The solution is then extracted with water and the organic layer is evaporated in vacuo to a solid residue. On recrystallization from ethanol, ethyl acetate, hexane-acetone, chloroform, etc. the imidazoisoindolene is obtained in good yield.

The compounds of FORMULAS I and II are pharmacologically active as antidepressant agents when administered orally to mammals.

The compounds have been orally administered to a group of six mice (3 males and 3 females). One hour later the animals are challenged with reserpine, 2.5 mg./kg. administered intraperitoneally. The degree of ptosis for each eye was determined at one and two hours post treatment. Prevention of reserpine ptosis is an indication of antidepressant activity. See Rubin et al. J.P.E.T. 120, 125 (1957). Controls are simultaneously run with amphetamine and Tofranil. The compounds of FORMULAS I and II were found to be active in mice at a dose of about 0.95 mg./kg. when administered orally.

The compounds have also been tested for anorexiant activity according to the following procedure:

Male Charles River rats between 120 and 140 grams are trained to drink sweetened condensed milk from a graduated drinking tube. After a short learning period the animals are placed on a routine of water ad lib for 24 hours, standard laboratory chow for 22 hours and sweetened condensed milk for 2 hours. The volume of milk consumed is measured at 30 minutes as well as 2 hours. The animals are weighed every day. This schedule is maintained 5 days a week over a period of several months. Drug trials are run on Thursdays and changes in milk consumed and 24 hour weight changes are compared to the average of the two days before drug administration. Animals are tested as groups of six and one grup is give saline each week to serve as controls. Drugs are usually administered intraperitoneally in saline or orally in water.

The compounds of the invention did not inhibit appetite when treated at dosage levels of up to 10 mg./kg of body weight, P.O.

The following examples have been added to illustrate but not to limit the scope of the invention:

EXAMPLE I

A solution of 50 g. of o-(p-chlorobenzoyl)benzoic acid, 100 ml. of toluene and 40 ml. of 1,2-diamino-2-methylpropane is refluxed in a flask equipped with a water separator. After refluxing for 17 hours, the solution is extracted with water and the organic portion evaporated in vacuo to a solid residue. On recrystallization from ethanol, there is obtained 9b-(p-chlorophenyl)-1,2,3,9b-tetrahydro-2,2-dimethyl-5H-imidazo[2,1-a]isoindol-5-one, m.p. 132°–134° C.

Anal. Calc'd for $C_{18}H_{17}ClN_2O$: C, 69.34; H, 5.17; N, 8.99; Cl, 11.11;
Found: C, 69.21; H, 5.40; N, 8.65; Cl, 11.30.

In a similar manner, reacting appropriate 1,1-dialkylethylene diamine with o-benzoylbenzoic acids, there is obtained:

1,2,3,9b-tetrahydro-2,2-diethyl-9b-phenyl-5H-imidazo[2,1-a]isoindol-5-one;

2,2-diethyl-9b-(3,4-diiodophenyl)-1,2,3,9b-tetrahydro-5H-imidazo[2,1-a]isoindol-5-one;

9b-(3,4-diethoxyphenyl)-1,2,3,9b-tetrahydro-2,2-dimethyl-5H-imidazo[2,1-a]isoindol-5-one;

2-ethyl-9b-(4-hexylphenyl)-1,2,3,9b-tetrahydro-2-methyl-5H-imidazo[2,1-a]isoindol-5-one;

7-amino-9b-(p-fluorophenyl)-1,2,3,9b-tetrahydro-2,2-dipropyl-5H-imidazo[2,1-a]isoindol-5-one; and 7-chloro-9b-(4-ethylphenyl)-1,2,3,9b-tetrahydro-2-methyl-2-propyl-5H-imidazo[2,1-a]isoindol-5-one.

EXAMPLE II

A solution of 50 g. of o-(p-fluorobenzoyl)benzoic acid, 150 ml. of toluene and 75 ml. of 1,2-diamino-2-methylpropane is refluxed in a flask equipped with a water separator. After refluxing for 19 hours the solution is extracted with water. The toluene layer is evaporated to dryness and the residue is recrystallized from aqueous alcohol to obtain 9b-(p-fluorophenyl)-1,2,3,9b-tetrahydro-2,2-dimethyl-5H-imidazo[2,1-a]isoindol-5-one, m.p. 108°–110° C.

Anal. Calc'd for $C_{18}H_{17}N_2FO$: C, 72.95; H, 5.78; N, 9.45.
Found: C, 72.83; H, 5.86; N, 9.45.

Similarly, 9b-(3-bromo-p-tolyl)-1,2,3,9b-tetrahydro-2,2-dimethyl-5-H-imidazo[2,1-a]isoindol-5-one; 1,2,3,9b-tetrahydro-2,2,7-trimethyl-9b-phenyl-5H-imidazo[2,1-a]isoindol-5-one; and 1,2,3,9b-tetrahydro-2,2-dimethyl-9b-phenyl-9-propyl-5H-imidazo[2,1-a]isoindol-5-one are prepared.

EXAMPLE III

A solution of 40 g. of o-benzoylbenzoic acid, 60 ml. of 1,2-diamino-2-methylpropane, and 150 ml. of toluene is refluxed in a flask equipped with a water separator. After refluxing eight hours the solution is extracted with water and the toluene portion is evaporated to dryness. The residue is recrystallized from ethanol to obtain 1,2,3,9b-tetrahydro-9b-phenyl-2,2-dimethyl-5H-imidazo[2,1-a]isoindol-5-one, m.p. 146°–149° C.

Anal. Calc'd for $C_{18}H_{18}N_2O$: C, 77.67; H, 6.52; N, 10.07.
Found: C, 77.35; H, 6.88; N, 10.15.

Repeating the above procedure, the following compounds are prepared:

9b-(3,4-dichlorophenyl)-1,2,3,9b-tetrahydro-2,2-dimethyl-5H-imidazo[2,1-a]isoindol-5-one;

2,2-diethyl-9b-(p-fluorophenyl)-1,2,3,9b-tetrahydro-5-H-imidazo[2,1-a]isoindol-5-one; and 1,2,3,9b-tetrahydro-2,2-dimethyl-9b-(p-tolyl)-5H-imidazo[2,1-a]isoindol-5-one.

EXAMPLE IV

A solution of 35 g. of o-(p-bromobenzoyl)benzoic acid, 125 ml. of toluene, and 50 ml. of 1,2-diamino-2-methylpropane is refluxed in a flask equipped with a water separator. After refluxing 6 hours, the solution is extracted with water. The toluene layer is evaporated to dryness in vacuo. On recrystallization from dilute alcohol there is obtained 9b-(p-bromophenyl)-1,2,3,9b-tetrahydro-2,2-dimethyl-5H-imidazo[2,1-a]isoindol-5-one, m.p. 133°–135° C.

Anal. Calc'd for $C_{18}H_{17}N_2BrO$: C, 60.51; H, 4.80; N, 7.84.
Found: C, 60.80; H, 4.91; N, 7.91.

EXAMPLE V

When the procedure of Examples I-IV is repeated to condense an appropriate 1,1-dialkylethylene diamine with a o-ketoacid, the following 2,2-dialkyl-9b-aryl-1,2,3,9b-tetrahydro-5H-imidazo[2,1-a]isoindol-5-ones are produced:

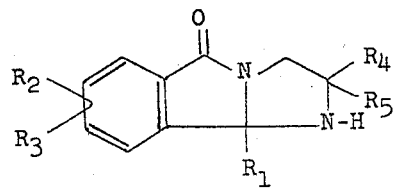

wherein $R_1$, $R_2$, $R_3$, $R_4$ and $R_5$ are as follows:

| $R_1$ | $R_2$ | $R_3$ | $R_4$ | $R_5$ |
|---|---|---|---|---|
| p-iodophenyl | 7-bromo | hydrogen | methyl | methyl |
| 3,4-dimethylphenyl | 8-methoxy | hydrogen | methyl | ethyl |
| p-methoxyphenyl | 7-chloro | 8-chloro | methyl | methyl |
| trifluoromethylphenyl | 7-methylamino | hydrogen | ethyl | ethyl |
| 2,5-dibromophenyl | 7-methyl | 8-methyl | methyl | methyl |
| 3,4-dimethoxyphenyl | 6-ethoxy | hydrogen | methyl | methyl |
| 2-thienyl | 7-methoxy | 8-methoxy | butyl | butyl |
| p-propoxyphenyl | 9-iodo | hydrogen | methyl | methyl |
| 2-pyridyl | 7-fluoro | 8-fluoro | methyl | butyl |
| 2,5-dipropoxyphenyl | hydrogen | hydrogen | methyl | methyl |
| 2-furyl | 7-ethyl | hydrogen | methyl | methyl |
| 3,4-diethylphenyl | 8-propylamino | hydrogen | methyl | methyl |
| tetrahydro-2-naphthyl | 7-ethyl | 9-ethyl | propyl | ethyl |
| o-chlorophenyl | hydrogen | hydrogen | methyl | methyl |
| phenyl | 8-ethyl | hydrogen | methyl | methyl |
| 2,5-dibutylphenyl | hydrogen | hydrogen | methyl | methyl |
| phenyl | hydrogen | hydrogen | ethyl | methyl |
| p-chlorophenyl | 7-ethoxy | hydrogen | methyl | methyl |
| m-chlorophenyl | hydrogen | hydrogen | methyl | methyl |

EXAMPLE VI

A mixture of 30 g. of 9b-(p-chlorophenyl)-1,2,3,9b-tetrahydro-2,2-dimethyl-5H-imidazo[2,1-a]isoindol-5-one, as prepared in Example I, and 100 ml. of 50% hydrochloric acid is heated in a steam bath. Solution occurs on heating for ten minutes; then solid begins to precipitate immediately. The mixture is cooled, filtered and washed with acetone to obtain 2-(2-amino-2-methylpropyl)-3-(p-chlorophenyl)-3-hydroxyphthalimidine hydrochloride, m.p. 230°–232° C.

This hydrochloride salt is neutralized with sodium carbonate solution to obtain the corresponding phthalimidine base, m.p. 208°–210° C., (recrystallized from ethanol).

Anal. Calc'd for $C_{18}H_{19}N_2ClO_2$: C, 65.35; H, 5.79; N, 8.47; Cl, 10.72.
Found: C, 65.48; H, 5.75; N, 8.43; Cl, 10.88.

Similarly, the following compounds are prepared from the other 2,2-dialkyl-9b-aryl-1,2,3,9b-tetrahydro-5H-imidazo[2,1-a]isoindol-5-ones of Example I:

2-(2-amino-2-ethylbutyl)-3-hydroxy-3-(3,4-diiodophenyl)phthalimidine;

2-(2-amino-2-methylpropyl)-3-(3,4-diethoxyphenyl)-3-hydroxyphthalimidine;

2-(2-amino-2-methylbutyl)-3-(4-hexylphenyl)-3-hydroxyphthalimidine;

6-amino-2-(2-amino-2-propylpentyl)-3-(p-fluorophenyl)-3-hydroxyphthalimidine; and 2-(2-amino-2-methylpentyl)-6-chloro-3-(p-ethylphenyl)-3-hydroxyphthalimidine.

EXAMPLE VII

A mixture of 45 g. of 9b-(p-fluorophenyl)-1,2,3,9b-tetrahydro-2,2-dimethyl-5H-imidazo[2,1-a]isoindol-5-one, as prepared in Example II, and 150 ml. of 50% hydrochloric acid is heated in a steam bath. After 10 minutes a clear solution forms; then solid begins to precipitate. The mixture is heated for an additional ten minutes, then cooled, filtered and washed with acetone. The solid obtained is 2-(2-amino-2-methylpropyl)-3-(p-fluorophenyl)-3-hydroxyphthalimidine hydrochloride, hydrate m.p. 177°–180° C. dec.

The hydrochloride salt is neutralized with sodium carbonate solution to obtain the phthalimidine base, m.p. 196°–199° C.

Anal. Calc'd for $C_{18}H_{19}N_2FO_2$: C, 68.78; H, 6.09; N, 8.91.
Found: C, 68.83; H, 6.18; N, 8.99.

Similarly, 2-(2-amino-2-methylpropyl)-3-(3-bromo-p-tolyl)-3-hydroxyphthalimidine; 2-(2-amino-2-methylpropyl)-3-hydroxy-6-methyl-3-phenylphthalimidine; and 2-(2-amino-2-methylpropyl)-3-hydroxy-3-phenyl-4-propylphthalimidine.

EXAMPLE VIII

A mixture of 47 g. of 1,2,3,9b-tetrahydro-9b-phenyl-2,2-dimethyl-5H-imidazo[2,1a]isoindol-5-one, as prepared in Example III, and 150 ml. of 50% hydrochloric acid is heated on a steam bath. Clear solution forms within 15 minutes then reprecipitation occurs. After heating an additional 5 minutes, the mixture is cooled and filtered to obtain 2-(2-amino-2-methylpropyl)-3-hydroxy-3-phenylphthalimidine hydrochloride, m.p. 252°–255° C. (dec.).

The above-prepared hydrochloride salt is neutralized with sodium carbonate solution to obtain the phthalimidine base, m.p. 172°–173° C.

Anal. Calc'd for $C_{18}H_{20}N_2O_2$: C, 72.94; H, 6.80; N, 9.45.
Found: C, 72.80; H, 6.93; N, 9.32.

Repeating the above procedure, the following compounds are prepared:

2-(2-amino-2-methylpropyl)-3-(3,4-dichlorophenyl)-3-hydroxyphthalimidine;

2-(2-amino-2-ethylbutyl)-3-(p-fluorophenyl)-3-hydroxyphthalimidine; and 2-(2-amino-2-methylpropyl)-3-hydroxy-3-(p-tolyl)phthalimidine.

EXAMPLE IX

A mixture of 33 g. of 9b-(p-bromophenyl)-1,2,3,9b-tetrahydro-2,2-dimethyl-5H-imidiazo[2,1-a]isoindol-5-one and 120 ml. of 50% hydrochloric acid is heated in a steam bath. Clear solution forms within 10 minutes then reprecipitation occurs. After heating an additional 10 minutes, the mixture is cooled and filtered to obtain 2(2-amino-2-methylpropyl)-3-(p-bromophenyl)-3-hydroxyphthalimidine hydrochloride, m.p. 227°–230° C. (dec.).

The above-prepared hydrochloride salt is neutralized with sodium carbonate solution to obtain the phthalimidine base, m.p. 194°–196° C.

Anal. Calc'd for $C_{18}H_{19}N_2Br_2O$: C, 57.61; H, 5.10; N, 7.46.
Found: C, 57.37; H, 5.19; N, 7.29.

EXAMPLE X

When the procedure of Examples VI-IX is repeated to hydrolize an appropriate 2,2-dialkyl-9b-aryl-1,2,3,9b-tetrahydro-5H-imidazo[2,1-a]isoindol-5-one, as described in Example V, the corresponding 2-(2-amino-2,2-dialkylethyl)-3-aryl-3-hydroxyphthalimidine hydrohalide is afforded which is then neutralized to produce the bases thereof having the formula:

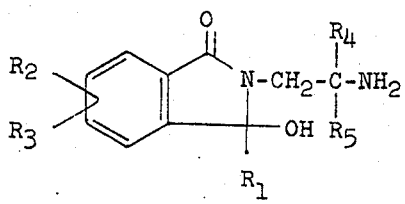

wherein $R_1$, $R_2$, $R_3$, $R_4$ and $R_5$ are as follows:

| $R_1$ | $R_2$ | $R_3$ | $R_4$ | $R_5$ |
|---|---|---|---|---|
| p-iodophenyl | 7-bromo | hydrogen | methyl | methyl |
| 3,4-dimethylphenyl | 8-methoxy | hydrogen | methyl | ethyl |
| p-methoxyphenyl | 7-chloro | 8-chloro | methyl | methyl |
| trifluoromethylphenyl | 7-methylamino | hydrogen | ethyl | ethyl |
| 2,5-dibromophenyl | 7-methyl | 8-methyl | methyl | methyl |
| 3,4-dimethoxyphenyl | 6-ethoxy | hydrogen | methyl | methyl |
| 2-thienyl | 7-methoxy | 8-methoxy | butyl | butyl |
| p-propoxyphenyl | 9-iodo | hydrogen | methyl | methyl |
| 2-pyridyl | 7-fluoro | 8-fluoro | methyl | butyl |
| 2,5-dipropoxyphenyl | hydrogen | hydrogen | methyl | methyl |
| 2-furyl | 7-ethyl | hydrogen | methyl | methyl |
| 3,4-diethylphenyl | 8-propylamino | hydrogen | methyl | methyl |
| 3,4-diethylphenyl | 8-propylamino | hydrogen | methyl | methyl |
| tetrahydro-2-naphthyl | 7-ethyl | 9-ethyl | propyl | ethyl |
| o-chlorophenyl | hydrogen | hydrogen | methyl | methyl |
| phenyl | 8-ethyl | hydrogen | methyl | methyl |
| 2,5-dibutylphenyl | hydrogen | hydrogen | methyl | methyl |
| phenyl | hydrogen | hydrogen | ethyl | methyl |
| p-chlorophenyl | 7-ethoxy | hydrogen | methyl | methyl |
| m-chlorophenyl | hydrogen | hydrogen | methyl | methyl |

EXAMPLE XI

The acid chloride prepared from 26 g. of o-(p-chlorobenzoyl)benzoic acid is dissolved in 40 ml. of acetone and is added dropwise with stirring to 35 ml. of 1,2-diamino-2-methylpropane and 150 ml. of pyridine. The mixture is stirred and refluxed for 1 hour then evaporated to dryness in vacuo. The residue is slurried with water and separated by filtration. On recrystallization from ethanol there is obtained 2-(2-amino-2-methylpropyl)-3-(p-chlorophenyl)-3-hydroxyphthalimidine, m.p. 208°–210° C.

In a similar manner, the acid halide of appropriate o-benzoylbenzoic acids are acylated to afford the following compounds:

2-(2-amino-2-methylpropyl)-3-(p-fluorophenyl)-3-hydroxyphthalimidine, m.p. 177°–180° C.;
2-(2-amino-2-methylpropyl)-3-hydroxy-3-phenylphthalimidine, m.p. 172°–173° C.; and
2-(2-amino-2-methylpropyl)-3-(p-bromophenyl)-3-hydroxyphthalimidine, m.p. 194°–196° C.

EXAMPLE XII

A mixture of 30 g. of 2-(2-amino-2-methylpropyl)-3-(p-chlorophenyl)-3-hydroxyphthalimidine hydrochloride, as prepared in Example VI, 30 g. of p-toluenesulfonyl chloride and 500 ml. of anhydrous pyridine is refluxed 18 hours. The mixture is evaporated to dryness. The residue is partitioned between ethyl acetate and water. The ethyl acetate portion is dried over magnesium sulfate then evaporated to dryness to a solid residue. On recrystallization from ethanol, there is obtained 9b-(p-chlorophenyl)-1,2,3,9b-tetrahydro-2,2-dimethyl-1-(p-tolylsulfonyl)-5H-imidazo[2,1-a]isoindol-5-one, m.p. 184°–186° C.

Anal. Calc'd for $C_{25}H_{23}ClN_2O_3S$: C, 64.24; H, 4.97; N, 6.00; Cl, 7.60; S, 6.87.
Found: C, 63.99; H, 4.83; N, 6.07; Cl, 7.60; S, 6.80.

A solution of 10 g. of the above-prepared 9b-(p-chlorophenyl)-1,2,3,9b-tetrahydro-2,2-dimethyl-1-(p-tolylsulfonyl)-5H-imidazo[2,1-a]isoindol-5-one and 25 ml. of 85% sulfuric acid is allowed to stand at room temperature for 2 hours. The reaction mixture which contains the sulfate salt of 4-chloro-2-(4,4(5,5)-dimethyl-2-imidazolin-2-yl)benzophenone is quenched with several volumes of ice water and made basic with concentrated sodium hydroxide solution. The precipitated solid is separated and washed with water. On recrystallization from ethanol there is obtained 5-(p-chlorophenyl)-2,3-dihydro-2,2(or 3,3)-dimethyl-5H-imidazo[2,1-a]isoindol-5-ol, m.p. 201°–203° C.

Anal. Calc'd for $C_{18}H_{17}N_2OCl$: C, 69.12; H, 5.49; N, 8.96; Cl, 11.34.
Found: C, 68.98; H, 5.41; N, 9.05; Cl, 11.49.

IR (KBr) 1,637cm$^{-1}$, 2,222–2,739 cm$^{-1}$

U.V. (95% EtOH) max. 222mμ ($\epsilon$=22,200)
max. 263mμ ($\epsilon$= 6,000)
max. 272mμ ($\epsilon$= 5,700)
(pH 1) max. 263mμ ($\epsilon$=12,960)

The compound of Example XII possesses in addition to its antidepressant activity the property of markedly reducing sleep at dosage levels which produce no signs of agitation or stimulation.

EXAMPLE XIII

A mixture of 35 g. of 2-(2-amino-2-methylpropyl)-3-(p-chlorophenyl)-3-hydroxyphthalimidine hydrochloride, as prepared in Example VI, 25 g. of p-toluenesulfonyl chloride and 125 ml. of anhydrous pyridine is refluxed for 3 hours. The solution is evaporated to dryness and the residue partitioned between ethylacetate and water. The ethyl acetate portion is evaporated to a solid residue. On recrystallization from ethanol there is obtained N-(2-[3-(p-chlorophenyl)-3-hydroxy-2-phthalimidinyl]-1,1-dimethylethyl)-p-toluenesulfonamide, m.p. 225°–277° C.

Anal. Calcd for $C_{25}H_{25}ClN_2O_4S$:  C, 61.91; H, 5.20; N, 5.78; Cl, 7.31; S, 6.61.
Found: C, 61.83; H, 5.00; N, 5.63; Cl, 7.43; S, 6.82.

A solution of 15 g. of the above-prepared N-(2-[3-(p-chlorophenyl)-3-hydroxy-2-phthalimidinyl]-1,1-dimethylethyl)-p-toluenesulfonamide and 40 ml. of 90% sulfuric acid is allowed to stand at room temperature for 45 minutes. The reaction mixture which contains the sulfate salt of 4-chloro-2-(4,4(5,5)-dimethyl-2-imidazolin-2-yl)benzophenone is quenched with several volumes of ice water and neutralized with concentrated sodium hydroxide solution. The solid is separated and washed with water. On recrystalliazation there is obtained 5-(p-chlorophenyl)-2,3-dihydro-2,2(or 3,3)-dimethyl-5H-imidazo[2,1-a]isoindol-5-ol,m.p. 199°–202° C. identical by the usual criteria to that obtained in Example XII.

A suspension of 1.5 g. of the above-prepared 5-(p-chlorophenyl)-2,3-dihydro-2,2(or 3,3)-dimethyl-5H-imidazo[2,1-a]isoindol-5-ol in 25 ml. of absolute ethanol is saturated with hydrogen chloride. The solution is evaporated to dryness in vacuo. The residue is triturated with ethyl acetate and separated by filtration. On recrystallization from ethanolethyl acetate mixture, there is obtained 4'-chloro-2-(4,4(5,5)-dimethyl-2-imidazolin-2-yl)benzophenone hydrochloride, m.p. 235°–238° C. dec.

Anal. Calc'd for $C_{18}H_{17}N_2OCl.HCl$:  C, 61.90; H, 5.19; N, 8.20; Cl, 20.30.
Found: C, 61.59; H, 5.29; N, 8.20; Cl, 20.53.

IR (KBr) 1,670 cm$^{-1}$, 2,558–2,941 cm$^{-1}$
U.V. (Isopropanol) max. 263 m$\mu$ ($\epsilon$ = 12,460)

EXAMPLE XIV

A mixture of 32 g. of 2-(2-amino-2-methylpropyl)-3-(p-fluorophenyl)-3-hydroxyphthalimidine, 22 g. of p-toluene-sulfonyl chloride and 200 ml. of pyridine is refluxed for 8 hours. The solution is evaporated to dryness in vacuo and the residue is partitioned between ethyl acetate and water. The ethyl acetate portion is evaporated to dryness. The residue is recrystallized from ethanol to obtain N-(2-[3-(p-fluorophenyl)-3-hydroxy-2-phthalimidinyl]-1,1-dimethylethyl)-p-toluene sulfonamide, m.p. 206°–209° C.

Anal. Calc'd for $C_{25}H_{25}N_2FSO_4$:  C, 64.09; H, 5.37; N, 6.30.
Found: C, 64.25; H, 5.39; N, 6.30.

A solution of 22 g. of N-(2-[3-(p-fluorophenyl)-3-hydroxy-2-phthalimidinyl]-1,1-dimethyl ethyl)-p-toluenesulfonamide, and 50 ml. of 90% sulfuric acid is allowed to stand at room temperature for 45 minutes. The mixture which contains the sulfate salt of 4'-fluoro-2-(4,4(5,5-dimethyl-2-imidazolin-2-yl)benzophenone is quenched with several volumes of ice water and neutralized with concentrated sodium hydroxide solution. The solid is separated and washed with water. On recrystallization from ethylacetate there is obtained 5-(p-fluorophenyl)-2,3-dihydro-2,2(or 3,3-)-dimethyl-5H-imidazo[2,1-a]isoindol-5-ol, m.p. 194°–196° C.

Anal. Calc'd for $C_{18}H_{17}N_2FO$: C, 72.96; H, 5.78; N, 9.45.
Found: C, 72.88; H, 5.91; N, 9.45.

IR (KBr) 1,658 cm$^{-1}$, 2,273–2,278 cm$^{-1}$

U.V. (95% EtOH)  max 260m$\mu$  ($\epsilon$= 5,760)
max 272m$\mu$  ($\epsilon$= 5,000)
(pH 1)  max 252m$\mu$  ($\epsilon$=13,000)

On treating 5-(p-fluorophenyl)-2,3-dihydro-2,2-dimethyl-5H-imidazo[2,1-a]isoindol-5-ol with hydrogen chloride, there is obtained 4'-fluoro-2-(4,4(5,5)-dimethyl-2-imidazolin-2-yl)benzophenone hydrochloride. M.P. 203–205° C.
Anal. Calc'd for $C_{18}H_{17}N_2FO.HCl$: C, 64.96; H, 5.45; N, 8.42.
Found: C, 64.79; H, 5.47; N, 8.39.
IR (KBr) 1,658 cm$^{-1}$, 2,600–2,941 cm$^{-1}$
U.V. (isopropanol) max 250 m$\mu$ ($\epsilon$ = 12,100)

EXAMPLE XV

A mixture of 27.5 g. of 2-(2amino-2-methylpropyl)-3-hydroxy-3-phenyl phthalimidine, 20 g. of p-toluenesulfonyl chloride and 200 ml. of pyridine is refluxed for 8 hours. The solution is evaporated to dryness. The residue is triturated with water and separated by filtration. On recrystallization from 95% ethanol there is obtained N-(2-[3-phenyl-3-hydroxy-2-phthalimidinyl]-1,1-dimethylethyl)-p-toluenesulfonamide, m.p. 197°–200° C.

Anal. Calc'd for $C_{25}H_{26}N_2SO_4$:  C, 66.64; H, 5.81; N, 6.22.
Found: C, 66.30; H, 5.70; N, 6.13.

A solution of 17 g. of N-(2-[3-phenyl-3-hydroxy-2-phthalimidinyl]-1,1-dimethylethyl)-p-toluenesulfonamide and 50 ml. of 90% sulfuric acid is allowed to stand at room temperature for 45 minutes. The solution which contains the sulfate salt of 2(4,4(5,5)-dimethyl-2-imidazolin-2-yl)benzophenone is quenched with several volumes of ice water and neutralized with concentrated sodium hydroxide solution. The solid is separated and washed with water. On recrystallization from ethanol there is obtained 5-phenyl-2,3-dihydro-2,2-dihydro-2,2(or 3,3)-dimethyl-5H-imidazo[2,1-a]isoindol-5-ol, m.p. 211°–212° C.

Anal. Calc'd for $C_{18}H_{18}N_2O$: C, 77.67; H, 6.52; N, 10.07.
Found: C, 77.44; H, 6.04; N, 9.87.

IR (KBr) 1,645 cm$^{-1}$, 2,273–2,790 cm$^{-1}$

U.V. (95% EtOH) max 260 mμ (ϵ= 4,900)
max 272 mμ (ϵ= 4,440)
(pH 1) max 250 mμ (ϵ=13,480)

On treating 5-phenyl-2,3-dihydro-2,2(or 3,3)-dimethyl-5H-imidazo[2,1-a]isoindol-5-ol with hydrogen chloride, there is obtained 2-(4,4(5,5)-dimethyl-2-imidazolin-2-yl)benzophenone, hydrochloride, m.p. 174°–176° C.

Anal. Calc'd for $C_{18}H_{18}N_2O \cdot HCl$: C, 68.68; H, 6.08; N, 8.90.
Found: C, 68.86; H, 6.07; N, 8.87.

IR (KBr) 1,645 cm$^{-1}$, 2,564–3,077 cm$^{-1}$
U.V. (isopropanol) max. 249 mμ (ϵ=12,940)

EXAMPLE XVI

A mixture of 16.8 g. of 2-(2-amino-2-methylpropyl)-3-(p-bromophenyl)-3-hydroxyphthalimidine, 10 g. of p-toluene-sulfonyl chloride and 100 ml. of pyridine is refluxed for 8 hours. The solution is evaporated to dryness and the residue is partitioned between ethyl acetate and water. The ethyl acetate portion is evaporated to a solid residue. On recrystallization from ethanol there is obtained N-(2-[3-(p-bromophenyl)-3-hydroxy-2-phthalimidinyl]-1,1-dimethylethyl)-p-toluenesulfonamide, m.p. 234°–237° C.

Anal. Calc'd for $C_{25}H_{25}N_2BrSO_4$: C, 56.71; H, 4.76; N, 5.30.
Found: C, 56.91; H, 4.65; N, 5.45.

A solution of 11 g. of N-(2-[3-(p-bromophenyl)-3-hydroxy-2-phthalimidinyl]-1,1-dimethylethyl)-p-toluenesulfonamide and 50 ml. of 90% sulfuric acid is allowed to stand at room temperature for 45 minutes. The solution which contains the sulfate salt of 4'-bromo-(4,4(5,5)-dimethyl-2-imidazolin-2-yl)benzophenone is quenched with several volumes of ice water and neutralized with concentrated sodium hydroxide solution. The solid is separated and washed with water. On recrystallization from ethyl acetate, there is obtained 5(p-bromophenyl)-2,3-dihydro-2,2(or 3,3)-dimethyl-5H-imidazo[2,1-a]isoindol-5-ol, m.p. 192°–194° C.

Anal. Calc'd for $C_{18}H_{17}N_2BrO$: C, 60.51; H, 4.79; N, 7.85.
Found: C, 60.51; H, 4.82; N, 7.82.

IR (KBr) 1,639 cm$^{-1}$, 2,273–2,778 cm$^{-1}$

U.V. (95% EtOH) max. 224 mμ (ϵ=24,400)
max. 263 mμ (ϵ= 6,780)
max. 275 mμ (ϵ= 6,400)
(pH 1) max. 267 mμ (ϵ=13,640)

On treating 5-(p-bromophenyl)-2,3-dihydro-2,2-dimethyl-5H-imidazo[2,1-a]isoindol-5-ol with hydrogen chloride there is obtained 4'-bromo-2-(4,4(5,5)-dimethyl-2-imidazolin-2-yl)benzophenone, hydrochloride. m.p. 222°–225° C.

Anal. Calc'd for $C_{18}H_{17}BrN_2O \cdot HCl$: C, 54.91; H, 4.61; N, 7.12.
Found: C, 55.09; H, 4.67; N, 6.75.

IR (KBr) 1,661 cm$^{-1}$, 2,500–2,941 cm$^{-1}$
U.V. (Isopropanol) max. 267mμ (ϵ = 14,500)

EXAMPLE XVII

When the procedure of Examples XIII–XVI is repeated to react appropriate 2-(2-amino-2-alkylalkyl-3-aryl-3-hydroxyphthalimidine hydrohalide with aryl or alkyl sulfonyl halides, there is afforded the following N-([3-aryl-3-hydroxy-2-phthalimidinyl]-1,1-dialkylalkyl)sulfonamides (I) which are then contacted with sulfuric acid to afford appropriate sulfate salts of 4,4(5,5)-dialkyl-2-imidazolin-2-yl-phenyl aroyl compounds (II) which are neutralized to afford appropriate 2,2(or 3,3-)-dialkyl-5-aryl-2,3-dihydro-5H-imidazo[2,1-a]isoindol-5-ols (III) which may be acidified e.g. hydrochloric acid, to afford the corresponding 4,4(5,5)-dialkyl-2-imidazolin-2-yl phenyl aroyl compound acid-addition salts (IV) e.g. hydrochloride, which compounds (I), (II), (III) and (IV) are depicted by the following formulae:

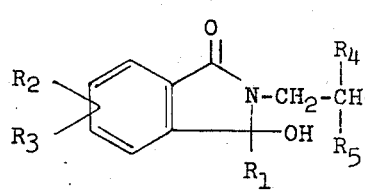

(I)

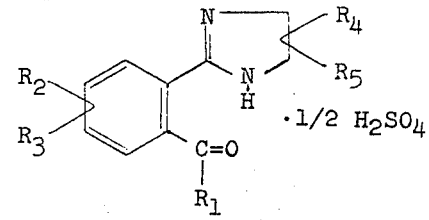

(II)

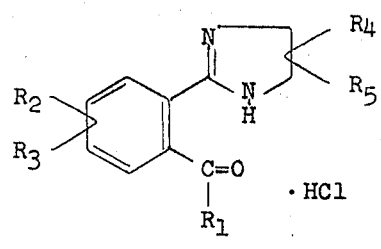

(IV)

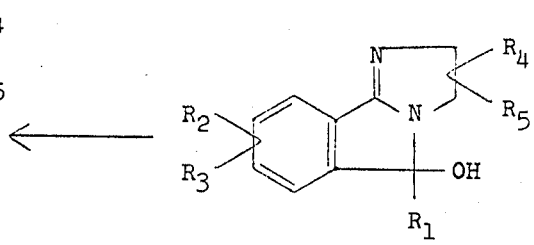

(III)

wherein $R_1$, $R_2$, $R_3$, $R_4$, $R_5$ and $R_7$ are defined below:

| $R_1$ | $R_2$ | $R_3$ | $R_4$ | $R_5$ | $R_7$ |
|---|---|---|---|---|---|
| p-iodophenyl | 7-bromo | hydrogen | methyl | methyl | ethyl |
| 3,4-dimethylphenyl | 8-methoxy | hydrogen | methyl | ethyl | phenyl |
| p-methoxyphenyl | 7-chloro | 8-chloro | methyl | methyl | p-chlorophenyl |
| trifluoromethylphenyl | 7-methylamino | hydrogen | ethyl | ethyl | phenyl |
| 2,5-dibromophenyl | 7-methyl | 8-methyl | methyl | methyl | p-bromophenyl |
| 3,4-dimethoxyphenyl | 6-ethoxy | hydrogen | methyl | methyl | 4-ethylphenyl |
| 2-thienyl | 7-methoxy | 8-methoxy | butyl | butyl | 3,4-dimethylphenyl |
| p-propoxyphenyl | 9-iodo | hydrogen | methyl | methyl | phenyl |
| 2-pyridyl | 7-fluoro | 8-fluoro | methyl | butyl | 2,5-dichlorophenyl |
| 2,5-dipropoxyphenyl | hydrogen | hydrogen | methyl | methyl | pentyl |
| 2-furyl | 7-ethyl | hydrogen | methyl | methyl | 3,4-dibromophenyl |
| 3,4-diethylphenyl | 8-propylamino | hydrogen | methyl | methyl | p-iodophenyl |
| tetrahydro-2-naphthyl | 7-ethyl | 9-ethyl | propyl | ethyl | p-methoxyphenyl |
| o-chlorophenyl | hydrogen | hydrogen | methyl | methyl | p-iodophenyl |
| phenyl | 8-ethyl | hydrogen | methyl | methyl | 3,4-difluorophenyl |
| 2,5-dibutylphenyl | hydrogen | hydrogen | methyl | methyl | p-ethoxyphenyl |
| phenyl | hydrogen | hydrogen | ethyl | methyl | 3,4-diethylphenyl |
| p-chlorophenyl | 7-ethoxy | hydrogen | methyl | methyl | p-fluorophenyl |
| m-chlorophenyl | hydrogen | hydrogen | methyl | methyl | p-ethoxyphenyl |

EXAMPLE XVIII

A solution of 21.5 g. of 2-(2-aminoethyl)-3-(p-chlorophenyl)-3-hydroxyphthalimidine, 13.3 g. of p-toluene-sulfonyl chloride and 150 ml. of pyridine is allowed to stand at room temperature for 18 hours. The mixture is quenched with water and extracted with ethyl acetate. The ethyl acetate portion is evaporated to dryness and the residue crystallizes on standing for three days. On recrystallization from aqueous ethanol there is obtained N-(2-[3-(p-chlorophenyl)-3-hydroxy-2-phthalimidinyl]ethyl)-p-toluenesulfonamide, m.p. 133°–136° C.

Anal. Calc'd for $C_{23}H_{21}N_2O_4SCl$: C, 60.32; H, 4.84; N, 6.12; Cl, 7.74.
Found: C, 60.54; H, 4.50; N, 6.08; Cl, 7.56.

A solution of 18 g. of N-(2-[3-p-chlorophenyl)-3-hydroxy-2-phthalimidinyl]ethyl)-p-toluenesulfonamide and 50 ml. of 90% sulfuric acid is allowed to stand at room temperature for 45 minutes. The solution containing the sulfate salt of 4'-chloro-2-(2-imidazolin-2-yl)benzophenone is quenched with several volumes of ice water and neutralized with concentrated sodium hydroxide solution. The solid is separated and washed with water. On recrystallization from dimethylacetamide there is obtained 5-(p-chlorophenyl)-2,3-dihyro-5H-imidazo[2,1-a]isoindol-5-ol, m.p. 208°–210° C. (dec.).

Anal. Calc'd for $C_{16}H_{12}N_2OCl$: C, 67.49; H, 4.60; N, 9.84; Cl, 12.45.
Found: C, 67.18; H, 4.32; N, 9.68; Cl, 12.70.

IR (KBr) 1,645 cm$^{-1}$, 2,380–3,000 cm$^{-1}$

| U.V. | (95% EtOH) max. | 223 mμ | ($\epsilon$=19,000) |
|---|---|---|---|
| | infl. | 242.5 mμ | ($\epsilon$=8,300) |
| | max. | 268.5 mμ | ($\epsilon$=4,400) |
| | max. | 272 mμ | ($\epsilon$=4,400) |
| | (pH 1) max. | 251 mμ | ($\epsilon$=11,000) |
| | max. | 264 mμ | ($\epsilon$=10,800) |

On treating 5-(p-chlorophenyl)-2,3-dihydro-5H-imidazo[2,1-a]isoindol-5-ol with hydrogen chloride, there is obtained 4'-chloro-2-(2-imidazolin-2-yl)benzophenone hydrochloride, m.p. 170°–172° C.

Anal. Calc'd for $C_{16}H_{13}N_2ClO \cdot HCl$: C, 59.80; H, 4.40; N, 8.72; Cl, 22.08.
Found: C, 59.63; H, 4.50; N, 8.72; Cl, 21.79.

IR (KBr) 1,647 cm$^{-1}$, 2,300–3,200 cm$^{-1}$

| U.V. (95% EtOH) | max. 252 mμ | ($\epsilon$=12,100) |
|---|---|---|
| | max. 265 mμ | ($\epsilon$=12,300) |
| (Isopropanol) | max. 264 mμ | ($\epsilon$=11,000) |

EXAMPLE XIX

When the procedure of Example XXII is repeated to react 2(2-aminoethyl)-3-aryl-3-hydroxyphthalimidine or hydrohalides with appropriate aryl or alkyl sulfonyl halides, there is afforded N-(2-[3-aryl-3-hydroxy-2-phthalimidinyl]alkyl)sulfonamides which are contacted with sulfuric acid to afford sulfate salts of 2-imidazolin-2-yl-phenyl aroyl compounds which are neutralized to yield the following 5-aryl-2,3-dihydro-5H-imidazo[2,1-a]isoindol-5-ols which are acidified e.g. hydrochloric acid to produce their corresponding hereinafter listed 2-imidazolin-2-yl phenyl aroyl compound acid-addition salts e.g. hydrochlorides.

| 5-ARYL-2,3-DIHYDRO-5-IMIDAZO[2,1-a]ISOINDOL-5-OLS | 2-IMIDAZOLIN-2-YL PHENYL AROYL COMPOUND HYDROCHLORIDES |
|---|---|
| 2,3-dihydro-5-(3',4'-diiodophenyl)-5H-imidazo-[2,1-a]isoindol-5-ol | 2-(2-imidazolin-2-yl)-3',4'-diiodobenzophenone hydrochloride |
| 5-(3',4'-diethoxyphenyl)-2,3-dihydro-5H-imidazo-[2,1-a]isoindol-5-ol | 3',4'-diethoxy-2-(2-imidazolin-2-yl)benzophenone hydrochloride |
| 2,3-dihydro-5-(4'-tolyl-5H-imidazo[2,1-a]isoindol-5-ol | 2-(2-imidazolin-2-yl)-4'-methylbenzophenone hydrochloride |

Table – Continued

| 5-ARYL-2,3-DIHYDRO-5-IMIDAZO[2,1-a]ISOINDOL-5-OLS | 2-IMIDAZOLIN-2-YL PHENYL AROYL COMPOUND HYDROCHLORIDES |
|---|---|
| 5-(4'-hexylphenyl)-2,3-dihydro-5H-imidazo[2,1-a]-isoindol-5-ol | 4'-hexyl-2-(2-imidazolin-2-yl)benzophenone hydrochloride |
| 2,3-dihydro-5-(2-thienyl)-5H-imidazo[2,1-a]isoindol-5-ol | 2-(2-imidazolin-2-yl)phenyl-2-thienyl ketone hydrochloride |
| 2,3-dihydro-8-methyl-5-phenyl-5H-imidazo[2,1-a]isoindol-5-ol | 2-(2-imidazolin-2-yl)-4-methylbenzophenone hydrochloride |
| 2,3-dihydro-5-phenyl-6-propyl-5H-imidazo[2,1-a]isoindol-5-ol | 2-(2-imidazolin-2-yl)-6-propylbenzophenone hydrochloride |
| 5-(4'-bromophenyl)-2,3-dihydro-5H-imidazo[2,1-a]-isoindol-5-ol | 4'-bromo-2-(2-imidazolin-2-yl)benzophenone hydrochloride |
| 5-(3',4'-dichlorophenyl)-2,3-dihydro-5H-imidazo-[2,1-a]isoindol-5-ol | 3',4'-dichloro-2-(2-imidazolin-2-yl)benzophenone hydrochloride |
| 5-(4'-fluorophenyl)-2,3-dihydro-5H-imidazo[2,1-a]isoindol-5-ol | 4'-fluoro-2-(2-imidazolin-2-yl)benzophenone hydrochloride |
| 5-(3'-bromo-4'-methylphenyl)-2,3-dihydro-5H-imidazo[2,1-a]-isoindol-5-ol | 3'-bromo-2-(2-imidazolin-2-yl)-4'-methylbenzophenone hydrochloride |
| 7-bromo-2,3-dihydro-5-(4-tolyl)-5H-imidazo[2,1-a]isoindol-5-ol | 5-bromo-2-(2-imidazolin-2-yl)-4'-methylbenzophenone hydrochloride |
| 7,8-dibromo-5-(4-bromophenyl)-2,3-dihydro-5H-imidazo[2,1-a]-isoindol-5-ol | 4,4',5-tribromo-2-(2-imidazolin-2-yl)benzophenone hydrochloride |
| 2,3-dihydro-5-(2,4-dimethoxyphenyl)-5H-imidazo[2,1-a]-isoindol-5-ol | 2-(2-imidazolin-2-yl)-2',4'-dimethoxybenzophenone hydrochloride |
| 5-(2,4-dibromophenyl)-2,3-dihydro-5H-imidazo[2,1-a]-isoindol-5-ol | 2',4'-dibromo-2-(2-imidazolin-2-yl)benzophenone hydrochloride |
| 2,3-dihydro-5-(5,6,7,8-tetrahydro-2-naphthyl)-5H-imidazo-[2,1-a]isoindol-5-ol | 2-(2-imidazolin-2-yl)phenyl-(5,6,7,8-tetrahydro-2-naphthyl)ketone hydrochloride |
| 5-(4-trifluoromethylphenyl)-2,3-dihydro-5H-imidazo[2,1-a]-isoindol-5-ol | 4'-trifluoromethyl-2-(2-imidazolin-2-yl)benzophenone hydrochloride |
| 5-(2-trifluoromethylphenyl)-2,3-dihydro-5H-imidazo[2,1-a]-isoindol-5-ol | 2'-trifluoromethyl-2-(2-imidazolin-2-yl)benzophenone hydrochloride |
| 5-furyl-2,3-dihydro-5H-imidazo[2,1-a]isoindol-5-ol | furyl-2-(2-imidazolin-2-yl)phenyl ketone hydrochloride |
| 5-(3-amino-4-chlorophenyl)-2-3-dihydro-5H-imidazo[2,1-a]isoindol-5-ol | 3'-amino-4'-chloro-2-(2-imidazolin-2-yl)benzophenone dihydrochloride |
| 7-chloro-2,3-dihydro-5-phenyl-5H-imidazo[2,1-a]isoindol-5-ol | 5-chloro-2-(2-imidazolin-2-yl)benzophenone hydrochloride |
| 2,3-dihydro-8-methyl-5-phenyl-5H-imidazo[2,1-a]isoindol-5-ol | 2-(2-imidazolin-2-yl)-4-methylbenzophenone hydrochloride |
| 7-ethylamino-2,3-dihydro-5-phenyl-5H-imidazo[2,1-a]isoindol-5-ol | 5-ethylamino-2-(2-imidazolin-2-yl)benzophenone dihydrochloride |
| 7,8-dichloro-2,3-dihydro-5-phenyl-5H-imidazo[2,1-a]isoindol-5-ol | 4,5-dichloro-2-(2-imidazolin-2-yl)benzophenone hydrochloride |
| 2,3-dihydro-7,8-dimethoxy-5-phenyl-5H-imidazo[2,1-a]isoindol-5-ol | 2-(2-imidazolin-2-yl)-4,5-dimethoxybenzophenone hydrochloride |
| 2,3-dihydro-5-(3-iodophenyl)-5H-imidazo[2,1-a]isoindol-5-ol | 2-(2-imidazolin-2-yl)-3'-iodobenzophenone hydrochloride |

Table—Continued

| 5-ARYL-2,3-DIHYDRO-5-IMIDAZO[2,1-a]ISOINDOL-5-OLS | 2-IMIDAZOLIN-2-YL PHENYL AROYL COMPOUND HYDROCHLORIDES |
|---|---|
| 8-amyl-2,3-dihydro-5-phenyl-5H-imidazo[2,1-a]isoindol-5-ol | 4-amyl-2-(2-imidazolin-2-yl)benzophenone hydrochloride |
| 2,3-dihydro-5-phenyl-7-propyl-5H-imidazo[2,1-a]isoindol-5-ol | 2-(2-imidazolin-2-yl)-5-propylbenzophenone hydrochloride |
| 8-butoxy-2,3-dihydro-5-phenyl-5H-imidazo[2,1-a]isoindol-5-ol | 4-butoxy-2-(2-imidazolin-2-yl)benzophenone hydrochloride |
| 2,3-dihydro-5-(3,4-dimethylphenyl)-5H-imidazo[2,1-a]isoindol-5-ol | 2-(2-imidazolin-2-yl)-3',4'-dimethylbenzophenone hydrochloride |
| 2,3-dihydro-5-(4-propoxyphenyl)-5H-imidazo[2,1-a]isoindol-5-ol | 2-(2-imidazolin-2-yl)-4'-propoxybenzophenone hydrochloride |

EXAMPLE XX

A solution of 10 g. of 2-(2-aminoethyl)-3-hydroxy-3-phenyl phthalimidine, 8 g. of p-toluenesulfonyl chloride and 50 ml. of pyridine is allowed to stand at room temperature for 6 hours. The mixture is quenched with water. The aqueous portion is separated and the oily residue is dissolved in ethyl acetate. The solution is extracted with water then evaporated to dryness in vacuo. The residue solidifies on standing. On recrystallization from ethanol there is obtained N-(2-[3-phenyl-3-hydroxy-2-phthalimidinyl]ethyl)-p-toluenesulfonamide, m.p. 160°–162° C.

Anal. Calc'd for $C_{23}H_{22}N_2O_4S$ : C, 65.38; H, 5.24; N, 6.63; S, 7.59.
Found : C, 65.22; H, 4.98; N, 6.52; S, 7.48.

EXAMPLE XXI

A solution of 7 g. of N-(2-[3-phenyl-3-hydroxy-2-phthalimidinyl]ethyl)-p-toluenesulfonamide and 20 ml. of 90% sulfuric acid is allowed to stand at room temperature for 30 minutes. The solution is quenched with ice water and extracted with ethyl acetate. The aqueous portion is neutralized with concentrated sodium hydroxide solution. The solid is separated and washed with water. On recrystallization from dimethyl acetamide there is obtained 5-phenyl-2,3-dihydro-5H-imidazo[2,1-a]isoindol-5-ol, m.p. 207°–210° C. (dec.).

Anal. Calc'd for $C_{16}H_{14}N_2O$ : C, 76.77; H, 5.63; N, 11.20.
Found : C, 76.63; H. 5.66; N. 11.00

IR (KBr) 1,645 cm⁻¹, 2,300–3,000 cm⁻¹

| U.V. (95% EtOH) | inf. 225 mμ | ($\epsilon$=14,900) |
| | max. 268 mμ | ($\epsilon$= 4,200) |
| (ph 1) | max. 250 mμ | ($\epsilon$=13,500) |

On treating 5-phenyl-2,3-dihydro-5H-imidazo[2,1-a]-isoindol-5-ol with hydrogen chloride, there is obtained 2-(2-imidazolin-2-yl)benzophenone hydrochloride, m.p. 195°–197° C. (dec.).

Anal. Calc'd for $C_{16}H_{14}N_2O \cdot HCl$ : C, 67.03; H, 5.27; N, 9.77; Cl, 12.36.
Found : C, 66.88; H, 5.33; N, 9.83; Cl, 12.50.

IR (KBr) 1,650 cm⁻¹, 2,400–3,200 cm⁻¹
U.V. (95% EtOH) max. 250 mμ ($\epsilon$ = 12,800).

What is claimed is:

1. A compound selected from the group consisting of those having the formula:

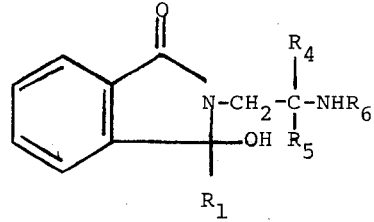

wherein $R_1$ is selected from the group consisting of phenyl, monohalophenyl, dihalophenyl, mono(lower)alkylphenyl, di(lower)alkylphenyl, trifluoromethylphenyl, mono(lower)alkoxyphenyl, di(lower)alkoxyphenyl; $R_4$ and $R_5$ are selected from the group consisting of hydrogen and lower alkyl; $R_6$ is selected from the group consisting of lower alkylsulfonyl, phenylsulfonyl, monohalophenylsulfonyl, dihalophenylsulfonyl, mono(lower)alkylphenylsulfonyl, di(lower)alkylphenylsulfonyl and lower alkoxyphenylsulfonyl.

2. A compound as described in claim 1 which is: N-(2-[3-(p-chlorophenyl)-3-hydroxy-2-phthalimidinyl]-1,1-dimethylethyl)-p-toluenesulfonamide.

3. A compound as described in claim 1 which is: N-(2-[3-(p-fluorophenyl)-3-hydroxy-2-phthalimidinyl]-1,1-dimethylethyl)-p-toluenesulfonamide.

4. A compound as described in claim 1 which is: N-(2-[3-hydroxy-3-phenyl-5-phthalimidinyl]-1,1-dimethylethyl)-p-toluenesulfonamide.

5. A compound as described in claim 1 which is: N-(2-[3-(p-bromophenyl)-3-hydroxy-2-phthalimidinyl]-1,1-dimethylethyl)-p-toluenesulfonamide.

6. A compound as described in claim 1 which is: N-(2-[3-(p-chlorophenyl)-3-hydroxy-2-phthalimidinyl]ethyl)-p-toluenesulfonamide.

7. A compound as described in claim 1 which is: N-(2-[3-hydroxy-3-phenyl-2-phthalimidinyl]ethyl)-p-toluenesulfonamide.

* * * * *